(12) United States Patent
Volkel et al.

(10) Patent No.: US 9,581,281 B2
(45) Date of Patent: Feb. 28, 2017

(54) DEVICE FOR INSERTING A NEW PIPE INTO AN OLD PIPE BY MEANS OF A SELF-DRIVEN IMPACT DEVICE

(71) Applicant: TRACTO-TECHNIK GmbH & Co. KG, Lennestadt (DE)

(72) Inventors: Gerhard Volkel, Erndtebruck (DE); Christian Loher, Eslohe (DE)

(73) Assignee: TRACTO-TECHNIK GMBH & CO. KG, Lennestadt (DE)

( * ) Notice: Subject to any disclaimer, the term of this patent is extended or adjusted under 35 U.S.C. 154(b) by 0 days.

(21) Appl. No.: 14/267,321

(22) Filed: May 1, 2014

(65) Prior Publication Data

US 2014/0360610 A1    Dec. 11, 2014

(30) Foreign Application Priority Data

May 3, 2013    (DE) .................. 10 2013 007 533

(51) Int. Cl.
*F16L 55/165* (2006.01)
*F16L 55/18* (2006.01)
*H02G 1/08* (2006.01)

(52) U.S. Cl.
CPC .......... *F16L 55/1657* (2013.01); *F16L 55/18* (2013.01); *H02G 1/088* (2013.01)

(58) Field of Classification Search
CPC ....... F16L 55/1657; F16L 55/18; F16L 55/26; H02G 10/88

USPC .............................. 138/97; 405/184.1, 184.3
See application file for complete search history.

(56) References Cited

U.S. PATENT DOCUMENTS

| 6,464,010 B1 * | 10/2002 | Brown .......................... 166/311 |
| 2012/0017386 A1 * | 1/2012 | Rankin et al. ........... 15/104.061 |

FOREIGN PATENT DOCUMENTS

| DE | 4312332 C2 | 10/1994 |
| DE | 10 2010 004 483 B3 | 7/2011 |
| DE | 10 2012 008 719 A1 | 11/2013 |

* cited by examiner

*Primary Examiner* — Tara M. Pinnock
(74) *Attorney, Agent, or Firm* — Howard IP Law Group, PC

(57) ABSTRACT

The invention relates to an apparatus for inserting a new pipe into an old pipe by means of a self-driven impact device, which simplifies the insertion of a new pipe into an old pipe, and wherein blocking elements of an apparatus according to the invention engage with the inside wall of an old pipe in order to prevent any movement of the self-driven impact device in a direction opposite the direction of advance, as well as a method for using the device. The apparatus according to the invention has blocking elements, which are disposed on at least one base body, but preferably four base bodies, which are in turn releasably mounted on the self-driven impact device. This method is characterized in that the base bodies together with the blocking elements and the self-driven impact device are salvaged by the new pipe.

10 Claims, 4 Drawing Sheets

DEVICE FOR INSERTING A NEW PIPE INTO AN OLD PIPE BY MEANS OF A SELF-DRIVEN IMPACT DEVICE

FIELD OF THE INVENTION

The invention relates to an apparatus for inserting a new pipe into an old pipe by means of a self-driven impact device, which simplifies the insertion of a new pipe into an old pipe and in which blocking elements of an apparatus according to the invention engage with the inside wall of an old pipe to prevent movement of the self-driven impact device in a direction opposite the direction of advance.

BACKGROUND

The invention also relates to a method, which makes it possible to salvage the base body together with the blocking elements and the self-driven impact device by passing through the new pipe.

Defective and/or old, leaking supply lines and/or disposal lines must often be repaired or replaced. One advisable method is to insert a new pipe into an existing old pipe with the help of a self-driven impact device.

DE 101 33 484 B4 discloses such a device, with which the impact device can move by means of friction elements, e.g., rollers, through the pipeline, e.g., for inserting a cable or a similar elongated body by means of an advancement adapter, comprising the impact device. This publication does not disclose how the self-driven impact device can be salvaged after passing through an existing line.

DE 10 2010 004 483 B3 discloses a similar device and a method in which a guide head as well as the impact device are released from the new pipe in the target position and the impact device is retracted back to the starting opening. Furthermore, this publication discloses that a guide head may be expandable and may be collapsed after reaching a target position and retracted back to the starting position through the new pipe. In addition this also discloses that a guide head, which can be released from the impact device, and is neither expandable nor reducible and consequently cannot be retrieved back into the starting position through the new pipe, may instead be forced out through the existing pipe system into which the restored pipe opens. For this purpose, it is advantageous to design the guide head to be floatable. Alternatively, the guide head may also be retrieved actively by means of additional equipment, for example, a duct robot.

A major disadvantage here is that the guide head may become stuck in an attempt to flush it out of a pipe system and it would thus clog this pipe system. Without an expensive opening up the pipe system, such a stuck guide head can no longer be salvaged. It is also possible that the line into which the line to be upgraded opens may have a smaller diameter, so that this method of salvage is entirely impossible. Salvaging a guide head by using a duct robot is very time-consuming and expensive.

The object of the present invention is to create a device for inserting a new pipe into an old pipe by means of a self-driven impact device, which avoids the aforementioned disadvantage of the prior art.

This object is achieved by a device and a method according to the independent claims. Advantageous embodiments are the subject matter of the dependent claims.

SUMMARY

The invention is based on the idea of equipping a self-driven impact device with an apparatus that may have blocking elements, which should prevent any movement of the self-driven impact device in a direction opposite the direction of advance. The blocking elements may be mounted on at least two, but preferably several base bodies, which may be disposed releasably around the impact device and may each have smaller dimensions than the diameter of the new pipe and may thus be salvaged by passing through the new pipe, like the impact device itself, after achieving a goal.

With the frame and the separating elements that are detachably connected directly or indirectly hereto, a rod magazine can be obtained that can be flexibly converted and/or expanded. The rod magazine according to the invention can be issued independently of the order and later put together specifically for the customer's wishes. A smaller storage space may be required.

An advancement adapter is created, for placement on a self-driven impact device, for advancing the self-driven impact device through the duct or lines having a larger diameter than the diameter of the self-driven impact device. The advancement adapter has blocking elements, which are in contact with the inside wall of the line or of the duct when disposed on the self-driven impact device. These blocking elements may be adjustable for adapting to different line diameters or for achieving different frictional values. The advancement adapter has at least two sections distributed around the circumference of the impact device, each connected to at least one blocking element. Due to the circumferential distribution of sections around the self-driven impact device this creates the possibility that, due to the sectional design of the advancement adapter, the advancement adapter can be released from the self-driven impact device in some sections that are smaller than the diameter of a new pipe to be inserted with the impact device, or the line, and thus, because of the smaller dimensions than the new pipe or the line, can be salvaged, such that they can be extracted out of the new pipe and/or the line in a direction opposite the direction of advance when they are released from the self-driven impact device.

The term "blocking element" is understood according to the invention to refer to an element, which enables movement in the direction of advance but blocks movement in the direction opposite the direction of advance. For example, the blocking element may be embodied as a friction element comprising a lip that can be curved opposite the direction of advance. Due to such a curvature, a movement in the direction of advance may be executed. In the case of a curvable lip, a change in the curvature, which is necessary for the movement opposite the direction of advance, is not possible because the lip rests against to the (old) duct or the (old) line. It is also possible for the blocking element to comprise a wheel that can be rotated in one direction. The connection of a section to at least one blocking element may be such that the blocking element extends transversely to the longitudinal axis of the impact device.

The sections are preferably disposed on the impact device with tensile force and/or shear resistance, such that the placement on the impact device with tensile strength and/or shear resistance is formed by the contact with the inside wall of the line or of the duct. Preferably no holding force can be actively exerted by the self-driven impact device on the sections in the direction transverse to the longitudinal axis of the impact device.

The sections may in particular lie loosely on the impact device. The inside wall of the line or of the duct may hold the sections in contact with the impact device. If the sections in contact with the impact device form a larger diameter than the inside diameter of the line or of the duct, then the sections may be kept in contact with the impact device. It is possible to provide that one section has at least one wall, preferably two walls, extending across the longitudinal direction of the impact device and in contact with one or two walls of the impact device that extend accordingly. A transfer of force, as a thrust by the impact device to the section, may be achieved by means of a wall extending across the longitudinal axis of the impact device. In particular, a section may have a region that is designed for a form-fitting connection with a region of the impact device. The elements achieving the form-fitting connection may extend across the longitudinal axis of the impact device. The contact between the section and the impact device may be embodied in one direction across the longitudinal axis of the impact device, such that this contact may be released due to the influence of gravity/gravitational force without any influence by the inside wall of the line or of the duct.

In a preferred embodiment, the sections of the advancement adapter are disposed in a region of the impact device that is free of undercuts in the direction transverse to the longitudinal axis of the impact device. These sections may then "fall away from the impact device due to the influence of gravity if the inside wall of the duct or of the line no longer actively exerts any pressure on the sections.

The sections are preferably designed in the form of segments of a circle, wherein an at least partially closed circumference around the impact device can, in particular, preferably be formed by the advancement adapter.

For salvaging the sections of the advancement adapter together with the impact device, the sections may be interconnected with one another and/or with the impact device. If the impact device is salvaged from the duct or the line, the sections are also salvaged by extracting and/or reversing the direction of the impact device.

It is possible to provide for the sections to be connected to a connecting means extending into a starting cavity for the impact device. The connecting means may be a cable, in particular a wire cable or multiple (wire) cables. The sections may then be salvaged independently of the impact device. The sections are preferably not connected to the impact device for salvaging the sections independently of the impact device.

The sections are preferably smaller than the inside diameter of a new pipe to be inserted with the impact device in at least one dimension, which may thus create the possibility that the section can be salvaged through the new pipe to be inserted with the impact device. The new pipe may be attached to the impact device for this insertion.

In a preferred embodiment, the sections, with the blocking element allocated thereto, can be formed as a single unit, in each case, from one material. This is achieved according to the invention by a device that can be disposed releasably at first around the self-driven impact device and consists of at least two, but preferably several, base bodies, which may be equipped with friction elements to prevent a movement of the self-driven impact device in a direction opposite the direction of advance. The base bodies with the friction means may be connected to one another by connecting elements as well as being connected to the impact device, so that they can be salvaged later by retracting the impact device through the new pipe back to the starting position.

In another embodiment, the base bodies may be connected to the friction elements by connecting elements, so that they are not connected to the self-driven impact device, but instead are connected to a connecting means, which is entrained in the advance from the starting position to the target position. With the help of the connecting means, the base body together with the friction elements may also be salvaged through the new pipe in the target position after salvaging the self-driven impact device.

However, the apparatus may also be designed, so that the at least two base bodies, but preferably several base bodies, are formed with friction elements as a unit made of the same material.

A method according to the invention may consist of the following steps:

Applying the base bodies that are connected to one another by connecting means, and to the self-driven impact device, with friction elements on the self-driven impact device.

Inserting the self-driven impact device, equipped with the base bodies with friction elements, into an old pipe.

Advancing the new pipe over the self-driven impact device and connecting the new pipe to the self-driven impact device, so that this step may also be performed before insertion of the impact device into the old pipe.

Running the combination of the base body with friction elements and the self-driven impact device with the new pipe through the old pipe up to a target position.

Releasing the base bodies, with friction elements disposed around the self-driven impact device, from the impact device.

Releasing the self-driven impact device from the new pipe.

Retracting the self-driven impact device and the base bodies with the friction elements through the new pipe to the starting position, wherein the base bodies with the friction elements can be retracted together with the self-driven impact device by pulling on the supply tube of the impact device and/or by reversing the self-driven impact device to retract it back to the starting position, or wherein the base bodies with the friction elements and the self-driven impact device can be retracted back to the starting position independently of one another.

Removing the components from the new pipe and the starting position

BRIEF DESCRIPTION OF THE FIGURES

The invention is explained in greater detail below on the basis of an exemplary embodiment as depicted in the drawings.

The drawings show.

DETAILED DESCRIPTION

Figure 1:
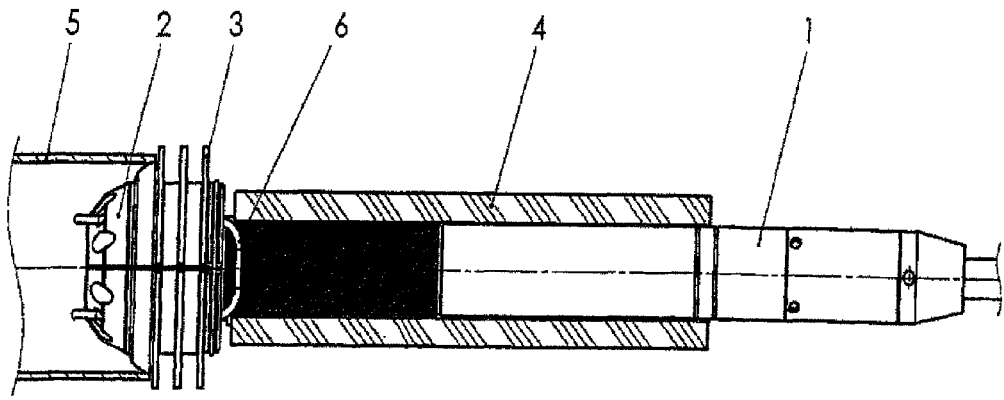
FIG. 1 a self-driven impact device with attached sections and/or base bodies with friction elements and a fastening device and/or entraining apparatus for a new pipe during insertion into an old pipe.

FIG. 1 shows a self-driven impact device 1, equipped with four base bodies and/or sections 2 having friction elements 3 on the circumference. Furthermore, the self-driven impact device 1 has an entraining apparatus 4, which makes it possible to attach a new pipe 7 to the self-driven impact device 1. The self-driven impact device 1 is to be inserted directly into a duct or a line, wherein the duct or line in the present example is an old pipe 5. The base bodies 2 with the friction elements 3 are connected to one another and to the impact device 1 by means of one or more (wire) cables 6.

Figure 2:
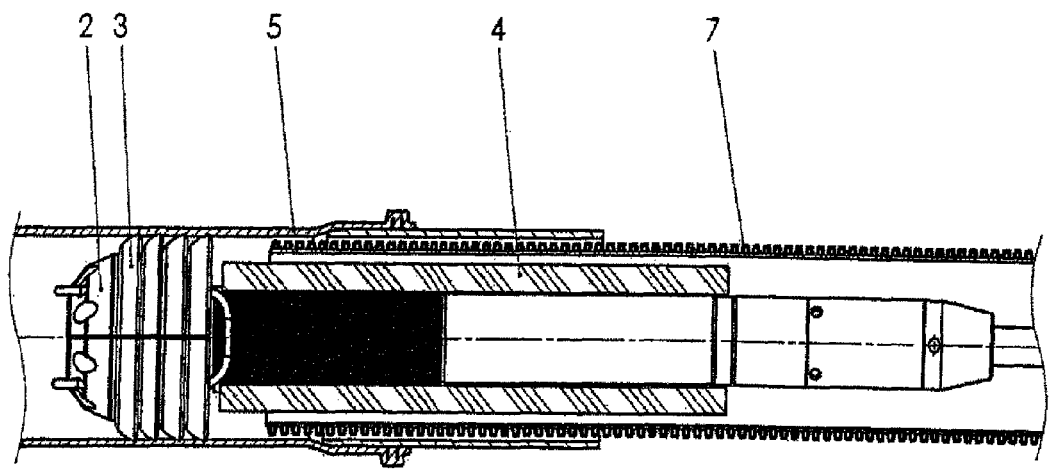
FIG. 2 a sectional diagram of a self-driven impact device equipped with base bodies with friction elements inserted into an old pipe, the new pipe being advanced over it.

FIG. 2 shows the self-driven impact device 1 with the four base bodies 2 with friction elements 3 already in the old pipe 5. The friction elements 3 are in close contact with the inside wall of the old pipe 5, to later prevent a reverse movement of the impact device 1 in the direction opposite the direction of advance ("floating") during operation of the self-driven impact device 1. A new pipe 7 has already been inserted, but is not yet connected to the self-driven impact device 1 by means of the entraining apparatus 4.

Figure 3:
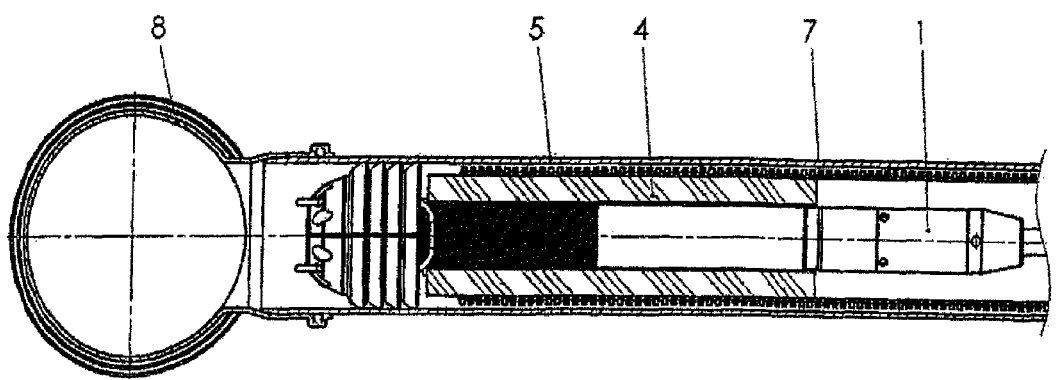
FIG. 3 a sectional diagram of a self-driven impact device connected to a new pipe, shortly before reaching the target position.

FIG. 3 shows the entire combination described above, shortly before arriving at the target position, which in this case is a main collector 8. The new pipe 7 is connected to the self-driven impact device 1 by the entraining apparatus 4, which in this case is an inflatable ring cushion, and can therefore be drawn directly into the old pipe 5.

Figure 4:
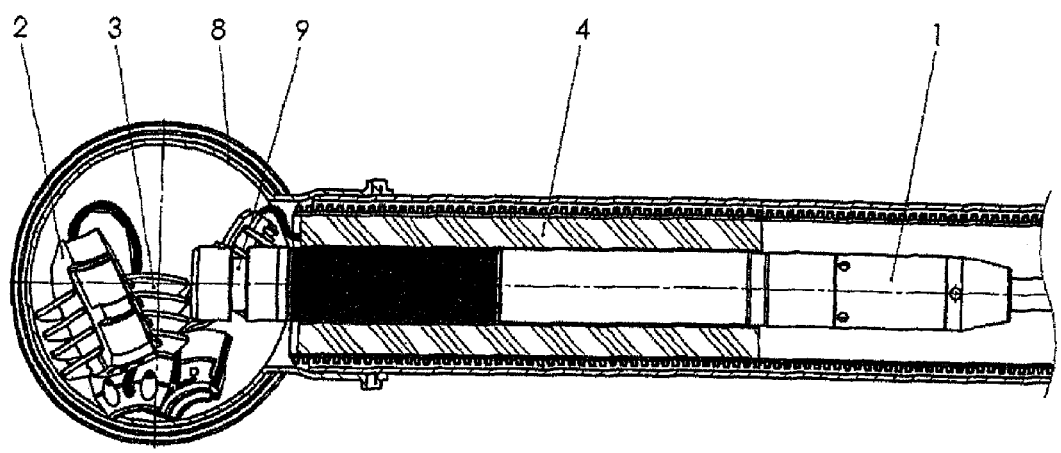
FIG. 4 a sectional diagram of the self-driven impact device after arrival at the target position and releasing the base body with the friction elements from the self-driven impact device.
Figure 5:
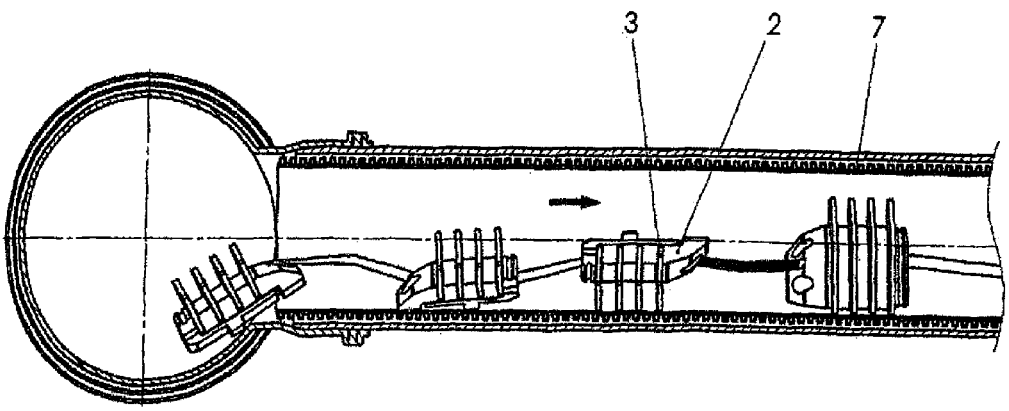
FIG. 5 retraction of the self-driven impact device (not shown in this figure) and base bodies with friction elements through the new pipe.

FIG. 4 shows the self-driven impact device 1 having advanced as far as the main collector 8. The four base bodies 2 with the friction elements 3 have fallen into the main collector 8 from the groove 9 holding them previously on the self-driven impact device 1 and they are now suspended loosely by means of the wire cable 6 on the self-driven impact device 1. The pressure medium, which is air in this case, is then discharged from the entraining apparatus 4, so that the self-driven impact device 1, with the base bodies 2 now suspended from it with the friction elements 3, can be moved through the new pipe 7 back to the starting position, illustrated in FIG. 5. The self-driven impact device 1 and the base body 2 with the friction elements 3 can then be salvaged at the starting position (not shown here).

The entraining apparatus 4 may also be designed as something other than an inflatable ring cushion. For example, it is possible for the entraining apparatus, which is connected to the impact device, to form a form-fitting, friction-locking or force-locking connection to the new pipe during insertion and/or during the impact operation of the impact device, and for the entraining effect of the entraining apparatus to be reversible by reversing the direction of movement of the impact device.

The entraining apparatus 4, illustrated in FIGS. 6 through 9, is designed differently in comparison with the embodiment illustrated in FIGS. 1 through 4. The entraining apparatus 4 in this embodiment has expandable wedge segments 40. The wedge segments 40 are supported on a cone 41. By shifting the cone 41, for example, by operation of the impact device 1, the wedge segments 40 can then be displaced outward to achieve an entraining effect on the new pipe 7. The wedge segments 40 are prestressed by a spring element 42 designed as a compression spring, so that a shifting of the cone 41 in the opposite direction results in the wedge segments 40 pulling against the spring pressure. The entraining apparatus may be designed so that the entraining apparatus can be wedged or jammed onto, or affixed to, the new pipe.

Figure 6:
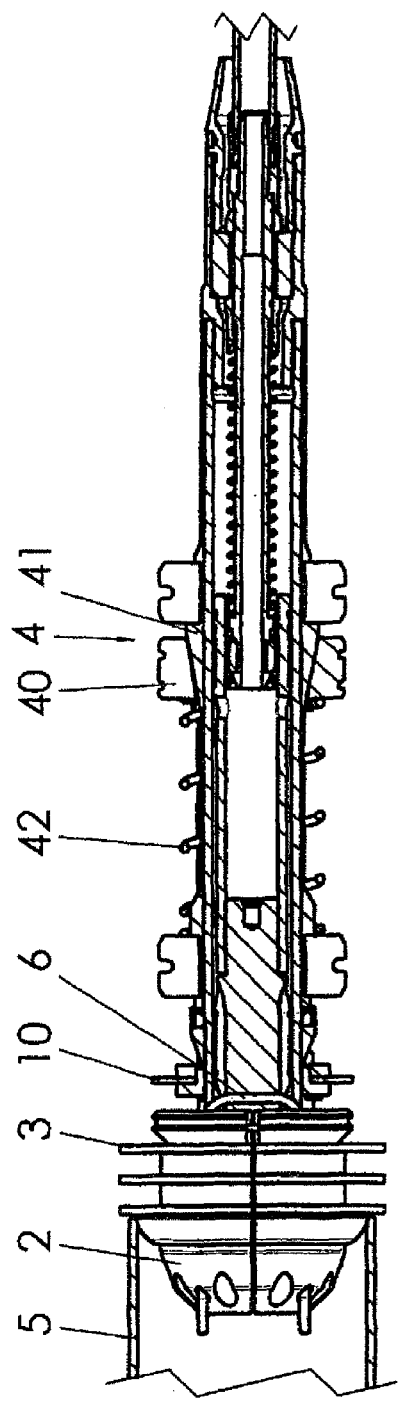
FIG. 6 one embodiment with a differently designed entraining apparatus, in comparison with the embodiment illustrated in FIG. 1, during insertion into an old pipe.
Figure 7:
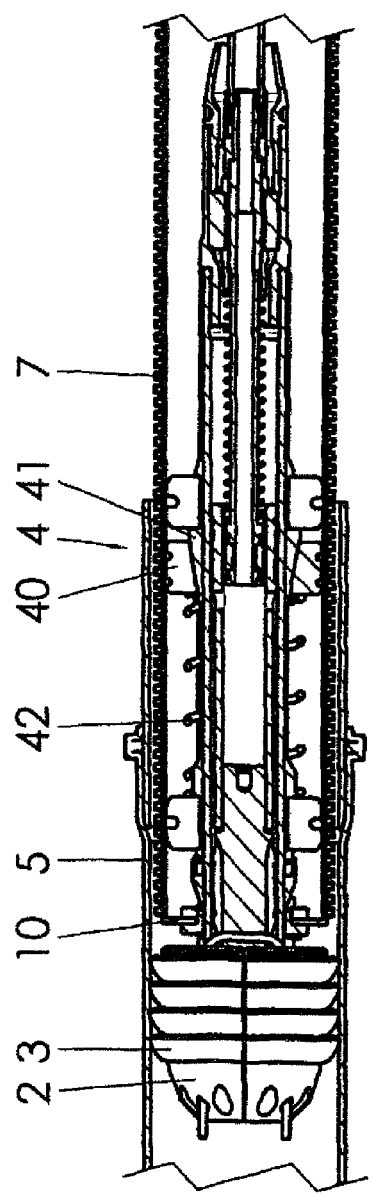
FIG. 7 an embodiment with a differently designed entraining apparatus, in comparison with the embodiment illustrated in FIG. 2, inserted into an old pipe.
Figure 8:
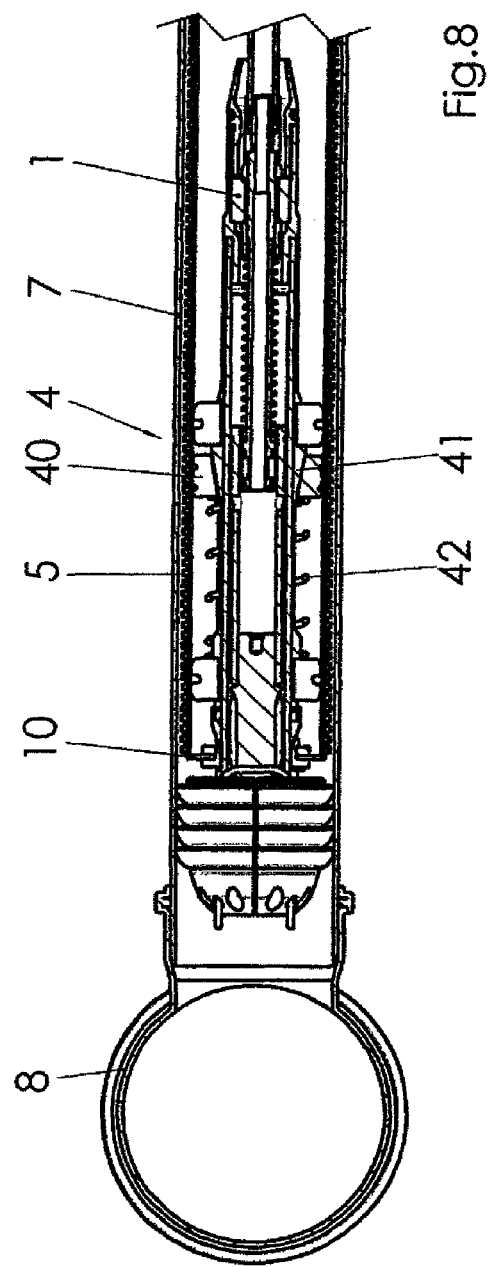
FIG. 8 an embodiment with a differently designed entraining apparatus, in comparison with the embodiment illustrated in FIG. 3, shortly before reaching the target position, and FIG. 9 an embodiment with a differently designed entraining apparatus, in comparison with the embodiment illustrated in FIG. 4, after arrival at the target position and releasing the base bodies with the friction elements from the self-driven impact device.
Figure 9:
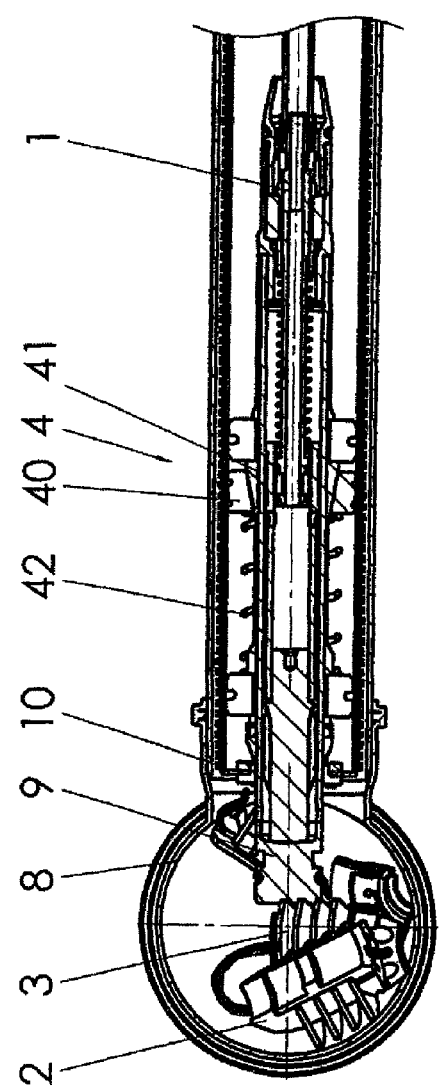

FIGS. 6 through 9 also show a flexible stop element 10 that can be overcome. The stop element 10 serves to improve the operability of the device apparatus. The impact device 1, with the applied sections 2, may be inserted into the old pipe 5 (FIG. 6). Subsequently the new pipe 7 can be inserted into the old pipe 5. The new pipe 7 may be inserted into the old pipe 5 up to the flexible stop element 10. A user receives a haptic acknowledgment by means of the flexible stop element 10. The stop element 10 does not constitute a stop in the traditional sense, because the stop element 10 can be overcome by the new pipe 7.

The invention claimed is:

1. A system comprising:
a self-driven impact device for advancing the self-driven impact device through ducts or lines having a larger diameter than the self-driven impact device, the self-driven impact device having an advancement adapter on the impact device, said advancement adapter comprising blocking elements configured to be in contact with the inside wall of the line or of the duct, the advancement adapter having at least two sections distributed around a circumference of the impact device, each section connected to at least one of said blocking elements, wherein the at least two sections are disposed in an area of the impact device which is free of undercuts in the direction transverse to the longitudinal axis of the impact device.

2. The system according to claim 1, wherein the at least two sections are configured in the form of arcs of a circle.

3. The system according to claim 1, wherein the at least two sections are connected to one another and/or to the impact device.

4. The system according to claim 1, wherein the at least two sections are connected to a connector configured to extend into a starting cavity.

5. The system according to claim 1, wherein the at least two sections are smaller, in at least one dimension, than the inside diameter of a new pipe to be inserted with the impact device.

6. The system according to claim 1, wherein the blocking elements comprise friction elements, and wherein the at least two sections are configured with a respective one of said friction elements as one unit each, of one material.

7. A system comprising:
a self-driven impact device for insertion through ducts or lines having a larger diameter than the self-driven impact device, the self-driven impact device having an advancement adapter on the impact device, said advancement adapter comprising blocking elements configured to be in contact with the inside wall of the line or of the duct, the advancement adapter having at least two sections distributed around a circumference of the impact device, each section connected to at least one of said blocking elements; and an entraining apparatus for fastening a new pipe on the impact device, wherein the new pipe has a diameter smaller than the diameter of the duct or line, wherein the at least two sections are disposed in an area of the impact device which is free of undercuts in the direction transverse to the longitudinal axis of the impact device.

8. The system according to claim 7, wherein the entraining apparatus includes expandable wedge segments.

9. The system according to claim 7, wherein the entraining apparatus includes an expandable ring cushion.

10. The system according to claim 7, wherein the at least two sections are disposed on the impact device with tensile force and/or shear resistance and wherein no holding force acts on the at least two sections in the direction transverse to the longitudinal axis of the impact device when the advancement adapter is not in contact with the inside wall of the line or of the duct.

* * * * *